(12) United States Patent
Suzuki

(10) Patent No.: US 6,334,364 B1
(45) Date of Patent: Jan. 1, 2002

(54) TORQUE SENSOR UNIT FOR REGULATING AXIAL MOVEMENT AND AXIAL LOAD

(75) Inventor: Osamu Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/397,139

(22) Filed: Sep. 16, 1999

(30) Foreign Application Priority Data

Sep. 16, 1998 (JP) .................................................. 10-261925

(51) Int. Cl.⁷ ........................................................ G01L 3/00
(52) U.S. Cl. ........................ 73/862.08; 180/444; 180/65.8
(58) Field of Search ................................. 180/65.8, 444; 73/862.08

(56) References Cited

U.S. PATENT DOCUMENTS

| | | | |
|---|---|---|---|
| 4,089,216 A | * 5/1978 | Elias | ........................... 73/862.31 |
| 4,182,168 A | 1/1980 | Desch | |
| 4,188,821 A | * 2/1980 | Elias | ............................... 73/136 |
| 4,487,270 A | 12/1984 | Huber | |
| 5,412,998 A | * 5/1995 | Nakamoto et al. | ............. 73/335 |

FOREIGN PATENT DOCUMENTS

JP 62-27604 6/1987

OTHER PUBLICATIONS

Patent Abstract of Japan; vol. 006 No. 029; Feb. 20, 1982.

* cited by examiner

Primary Examiner—Benjamin R. Fuller
Assistant Examiner—Andre Allen

(57) ABSTRACT

A torque sensor unit includes a countershaft, and helical gears for providing the countershaft with not only torque but also axial load generated by engaged gears. Axial load measuring instruments are disposed coaxially with the countershaft in order to regulate axial movement of the countershaft and to measure the axial load.

9 Claims, 16 Drawing Sheets

TORQUE SENSOR UNIT FOR REGULATING AXIAL MOVEMENT AND AXIAL LOAD

BACKGROUND OF THE INVENTION

1. Field of the Invention

This invention relates to a torque sensor unit.

2. Description of Related Art

An example of existing torque sensor units is disclosed in Japanese Patent Publication No. Sho 62-27604, entitled "Control Unit for Hybrid Vehicle."

According to FIGS. 11 and 12 of this publication, the torque sensing mechanism includes two coaxial shafts $SH_1$ and $SH_2$; a torsion bar TB connecting one end of the shaft $SH_1$, and one end of the shaft $SH_2$; metallic gears $G_1$, and $G_2$ fixed to opposite ends of the torsion bar TB; magnetic sensors $MS_1$ and $MS_2$ positioned near tooth tops of the gears $G_1$, and $G_2$; and a phase comparator PC receiving AC signals from the magnetic sensors $MS_1$, and $MS_2$. A phase difference ø of the AC signals from the magnetic sensors $MS_1$ and $MS_2$ varies as the torsion bar TB twists in response to torque. The phase comparator PC can detect torque on the basis of the phase difference ø.

The foregoing torque detecting mechanism is a large torque sensor unit in which the metallic gears $G_1$, and $G_2$ are fixedly attached to the torsion bar TB and the magnetic sensors $MS_1$, and $MS_2$ are disposed around the gears.

SUMMARY AND OBJECTS OF THE INVENTION

It is therefore an object of the invention to provide a compact torque sensor unit.

In order to accomplish the above object, there is provided a torque sensor unit which includes a countershaft; helical gears for providing said countershaft with not only torque but also axial load generated by their mutual engagement; and axial load measuring means disposed coaxially with the countershaft for the purpose of regulating axial movement of the countershaft and measuring the axial load.

The helical gears are attached on the countershaft and generate axial load when they are mutually engaged. The axial load is transmitted via the countershaft to the axial load measuring instruments which are coaxial with the countershaft, and can be measured by the measuring instruments. The axial load is generated in accordance with the torque, and is measured by the measuring instruments coaxial with the countershaft, thereby downsizing the torque sensor unit.

According to the present invention, thrust bearings are interposed between the countershaft and the axial load measuring instruments.

The thrust bearings are effective in reducing frictional resistance in the rotating direction between the countershaft and the axial load measuring instruments. There is no fear that rotational moment caused in response to the rotation of the countershaft acts on the axial load measuring instruments. Therefore, only the axial load acts on the measuring instruments, which can improve detecting precision of the torque sensor unit because noise components are reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
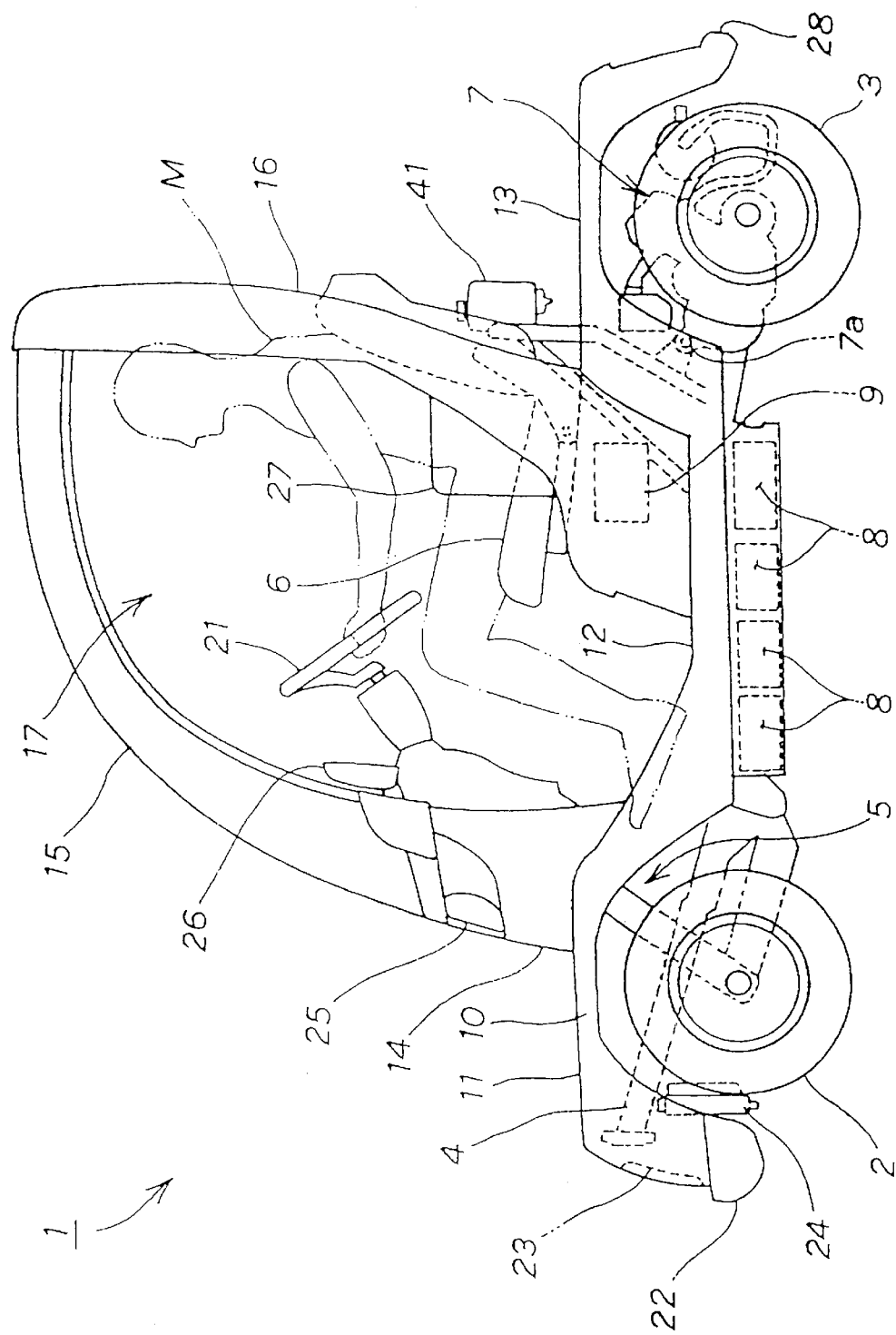
FIG. 1 is a side elevation of the hybrid vehicle to which the invention is applicable.

The invention will be described with reference to an embodiment shown in the accompanying drawings. In the following description, "front, rear, left, right, upper and lower" sides denote directions viewed from a driver on a vehicle. Further, the drawings should be observed in the orientation of reference numerals.

FIG. 1 is a left side view of a hybrid vehicle 1 to which the invention is applicable. The hybrid vehicle 1 is a four-wheel vehicle, and comprises: a body frame 4 having a pair of front wheels 2 (the right front wheel 2 is not shown in FIG. 1) and a pair of rear wheels 3 (with the right rear wheel 3 omitted). A steering mechanism 5 is provided at the front part of the body frame 4; a driver's seat 6 substantially at the center of the body frame 4; a driving unit 7 at the rear part of the body frame 4; a plurality of batteries 8 positioned under the center of the floor level of the body frame 4; a control unit 9 positioned under the seat 6; and a body cover 10 attached to the body frame 4.

The body cover 10 includes a front deck 11 covering the front part of the body frame 4; a step floor 12 extending from the rear part of the front deck 11 and covering the center part of the body frame 4; a rear deck 13 extending from the rear part of the step floor 12 and covering the rear part of the body frame 4; a front cover 14 extending upwardly from the rear part of the front deck 13; a curved roof 15 extending upwardly and rearwardly from the upper part of the front cover 14; and a rear cover 16 extending downwardly from the rear part of the roof 15 to the rear part of the step floor 12.

A cab 17 is defined by the step floor 12, front cover 14, roof 15 and rear cover 16, and is provided with the seat 6 and a steering wheel 21. The front and rear decks 11 and 13 are made of cover members through which the driver can get in and out of the vehicle. Therefore, the driver can mount the vehicle either via the front deck 11 or the rear deck 13. The roof 15 is made of a transparent or translucent material.

In FIG. 1, a front bumper 22, a radiator grill 23, a radiator 24 and right and left head lamps 25 are provided. Right and left outside mirrors 26 and right and left side protectors 27 as provided together with a rear bumper 28 and a driver M.

Figure 2:
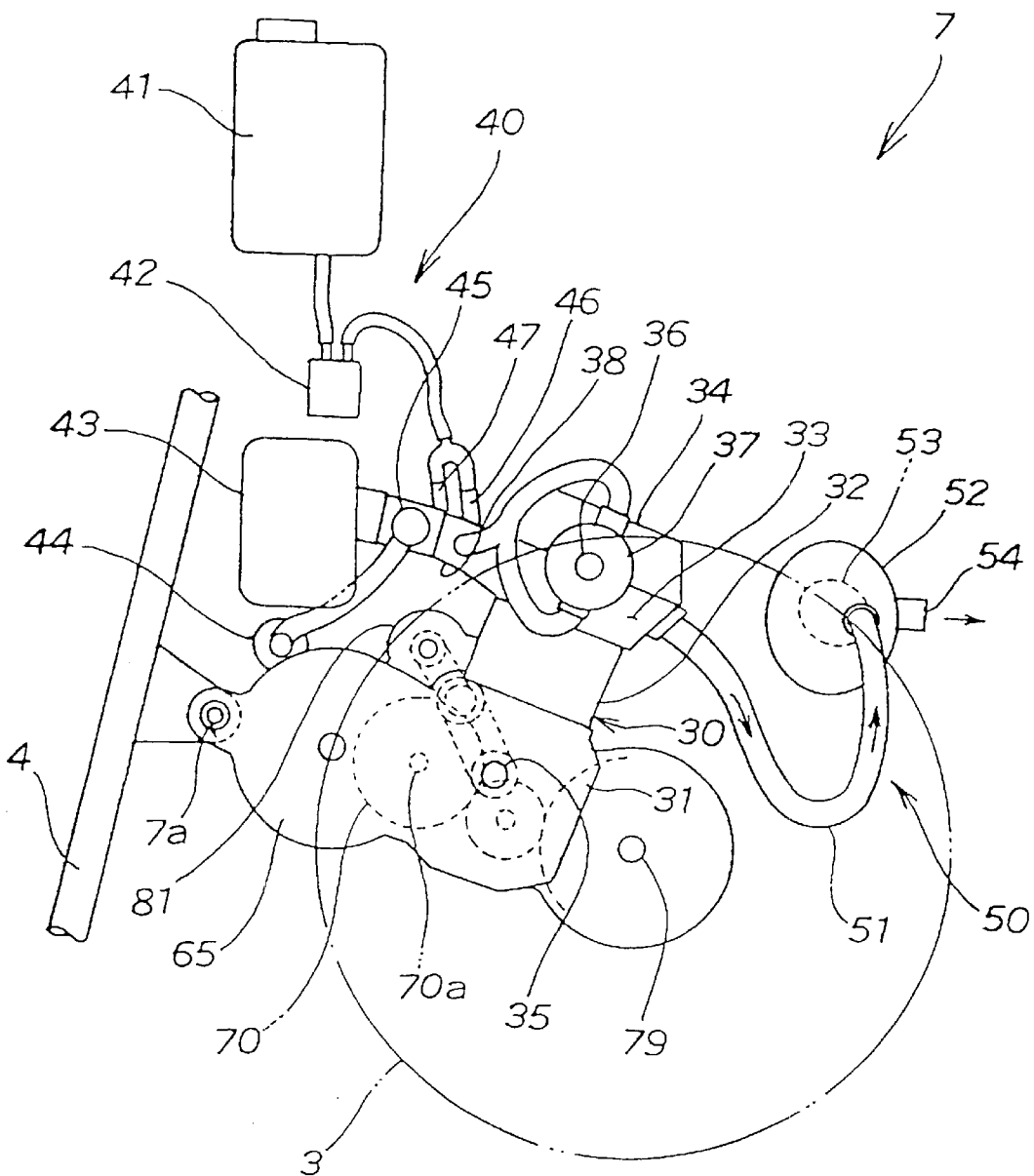
FIG. 2 is a side elevation of the drive unit of the invention.

FIG. 2 is a side view of the driving unit 7 related to the invention and attached to the body frame 4 using a pivot 7a.

The driving unit 7 can swing up and down, and drives the rear wheels 3, i.e. driving wheels, via rear axles 79 when activated by an engine 30 and a motor 70. Specifically, the driving unit 7 includes the engine 30, fuel-air supply system 40, exhaust system 50, a variably continuous conical transmission 65, motor 70, and engine starting motor 81.

The engine 30 mainly includes a crankcase 31, a cylinder block 32, a cylinder head 33, a head cover 34, a crankshaft 35, a camshaft 36, a mechanical pump 37 rotating integrally with the camshaft 36, and an intake manifold 38.

The fuel-air supply system 40 mainly includes a fuel tank 41, a fuel pump 42, an air cleaner 43, a servo motor 44, a throttle pulley 45, a main injector 46, and a sub-injector 47 for supercharging.

The exhaust system 50 mainly includes an exhaust pipe 51, a muffler 52, a metallic catalyst 53, and a tail pipe 54.

Figure 3:
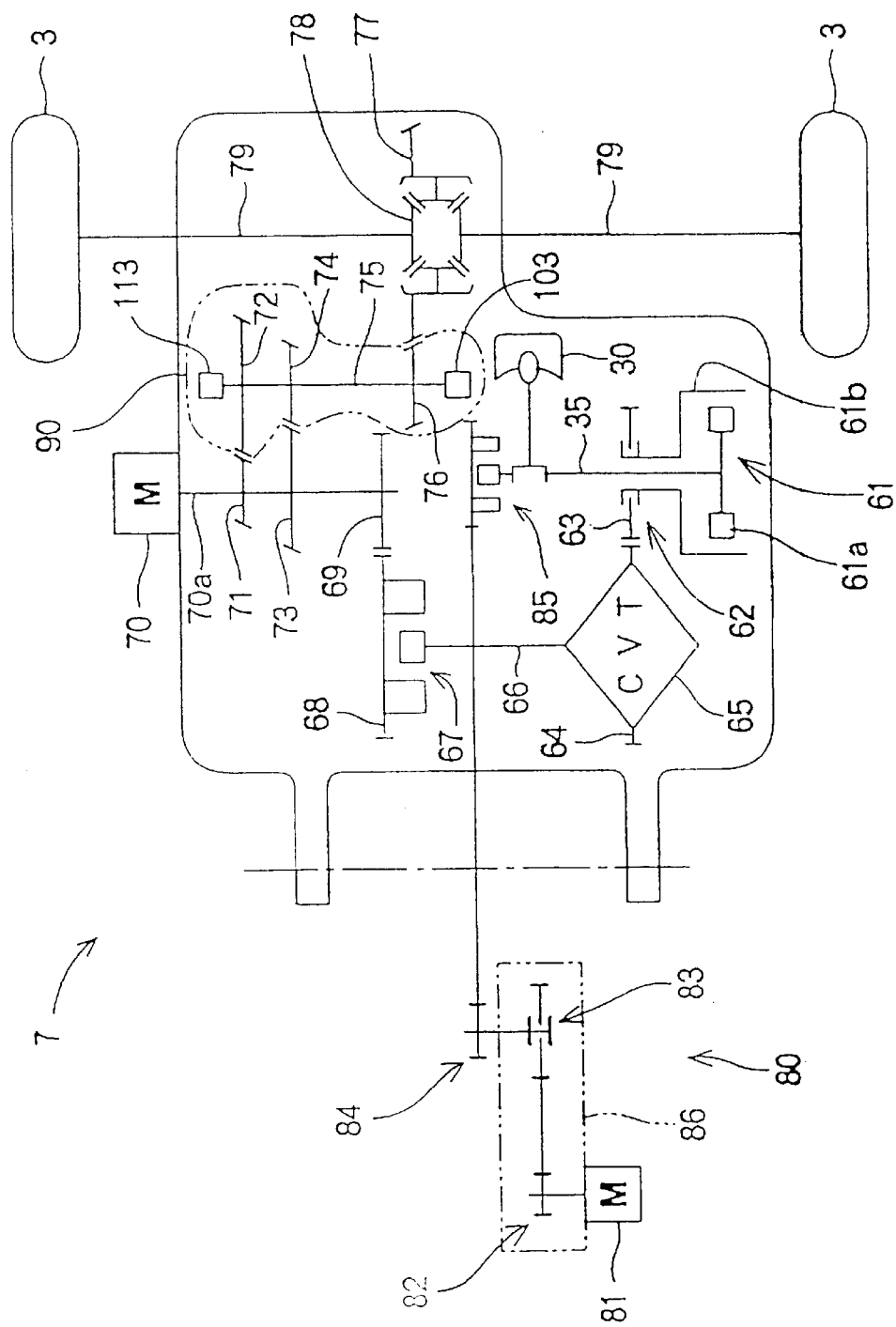
FIG. 3 is a schematic view of the drive unit of the invention.

FIG. 3 is a schematic development view of the driving unit 7 of the invention.

A power transmission system of the driving unit 7 includes: the engine 30; a centrifugal clutch 61 coupled to the crankshaft 35 of the engine 30; a torque limiter 62 coupled to the centrifugal clutch 61; a continuously variable conical transmission 65 coupled to the torque limiter 65 via first and second gears 63 and 64; a one-way clutch 67 coupled to an output side of the continuously variable transmission 65 via a link 66; the motor 70 having a motor shaft 70a coupled to the one-way clutch 67 via third and fourth gears 68 and 69; a countershaft 75 coupled to the motor shaft 70a via a combination of fifth and six gears 71 and 72 and a combination of seventh and eighth gears 73 and 74; differential gears 78 coupled to the countershaft 75 via ninth and tenth gears 76 and 77; and a pair of right and left rear axles 79 coupled to the differential gears 78.

The centrifugal clutch 61 includes an inner part 61a coupled to the crankshaft 35 and an outer part 61b coupled to the torque limiter 62. The inner part 61 is engaged with the outer parts 61 a by centrifugal force.

The motor shaft 70a functions as a torque merging point where torque from the engine 30 and torque from the motor 70 merge with each other.

A torque sensor 90 includes the sixth, eighth and ninth gears 72, 74 and 76, and the countershaft 75 on which the foregoing gears are disposed. The countershaft 75 is interposed in a path for transmitting torque to the rear wheels 3 (i.e. the driving wheels) from the engine 30 and the motor 70 both of which serve as a driving source for the hybrid vehicle. The first and second axial torque measuring instruments 103 and 113 are assembled in the countershaft 75. This will be described in detail later. Therefore, the driving unit 7 can be made compact compared with a case where a torque detecting member is separately provided.

The structure of the torque sensor 90 will be described in detail later. The driving unit 7 also includes the engine starter 80 for starting the engine 30. The engine starter 80 transmits torque of the engine starting motor 81 to the crankshaft 35 via a belt drive mechanism 82, torque limiter 83, chain drive mechanism 84, and one-way clutch 85. A casing 86 is provided.

Figure 4:
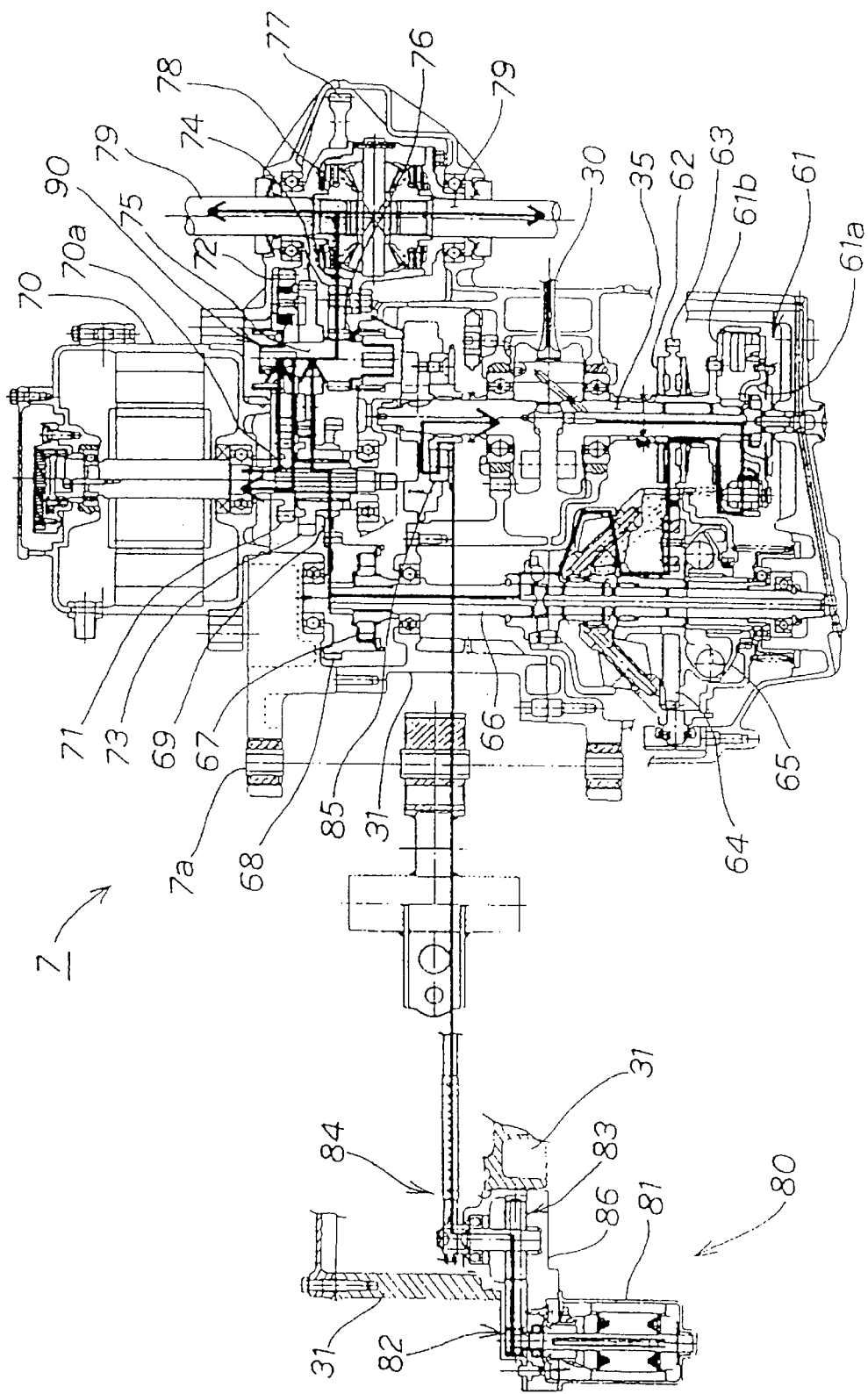
FIG. 4 is a sectional view of the power transmission system of the drive unit.

FIG. 4 is a sectional view of the power transmission system of the driving unit, and specifically a developed view of the engine 30, centrifugal clutch 61, torque limiter 62, continuously variable transmission 65, one-way clutch 67, motor 70, torque sensor 90, differential gears 78, right and left rear axles 79, and engine starter 80, all of which constitute the driving unit 7.

Figure 5:
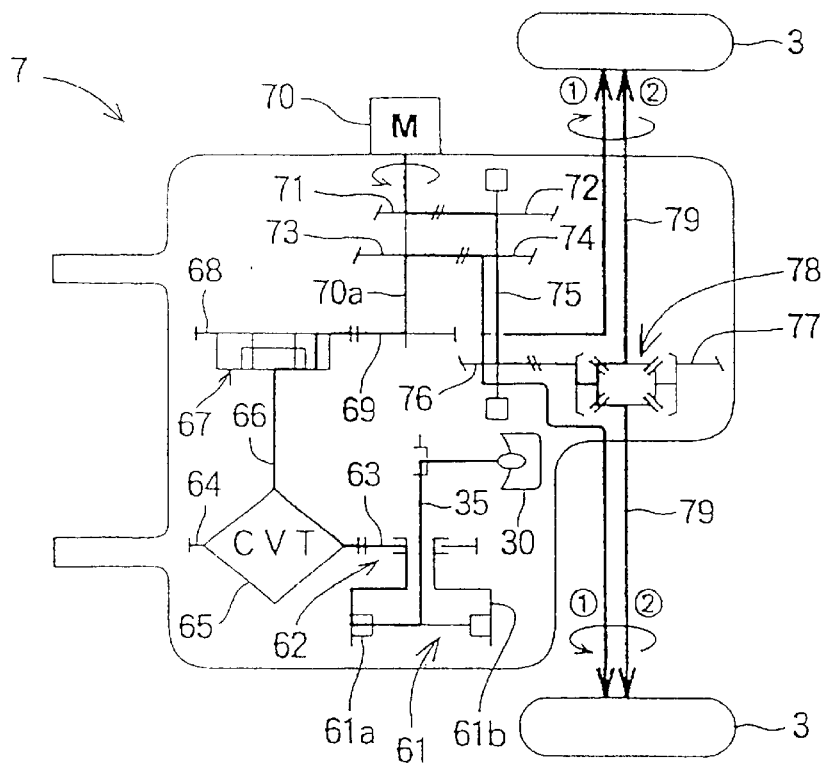
FIG. 5 shows the first operation of the drive unit.

The operation of the driving unit 7 will be described with reference to FIG. 5 to FIG. 9. Specifically, FIG. 5 shows a first operation of the driving unit 7 in which the rear wheels 3 are driven by a resultant force of the engine 30 and the motor 70.

The engine 30 transmits torque to the right and left rear axles 79 via the crankshaft 35, centrifugal clutch 61, torque limiter 62, first gear 63, second gear 64, continuously variable transmission 65, link 66, one-way clutch 67, third gear 68, fourth gear 69, motor shaft 70a, seventh gear 73, eighth gear 74, countershaft 75, ninth gear 76, tenth gear 77, and differential gears 78, as shown by a circled arrow 1, thereby driving the rear wheels 3.

On the other hand, the motor 70 transmits torque to the right and left rear axles 79 via the motor shaft 70a, fifth gear 71, sixth gear 72, countershaft 75, ninth gear 76, tenth gear 77, and differential gears 78, as shown by a circled arrow 2 and the rear wheels 3 are driven. The torque from the engine 30 and from the motor 70 is combined at the motor shaft 70a, thereby producing a resultant force.

Since the centrifugal clutch 61 is interposed between the engine 30 and the rear wheels 3, torque can be smoothly and gradually transmitted to the rear wheels 3 when the vehicle is started by the engine 30. This allows smooth starting of the hybrid vehicle.

The continuously variable transmission 65 is coupled to the outer part 61b of the centrifugal clutch 61 via the torque limiter 62, so that the engine 30 is not affected by excessive reverse torque from the rear wheels 3.

Figure 6:
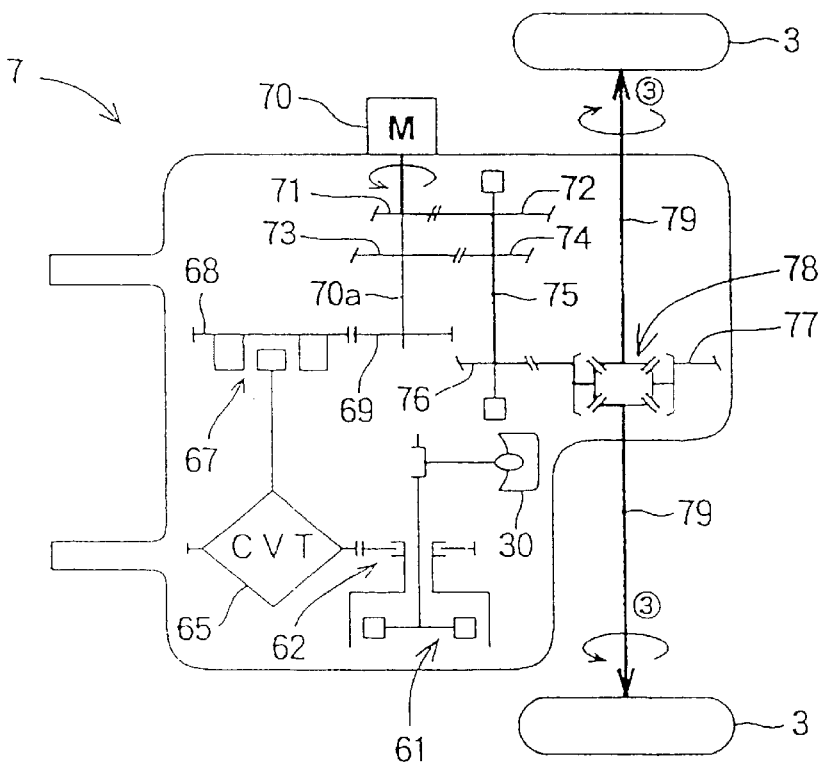
FIG. 6 shows the second operation of the drive unit.

FIG. 6 shows a second operation of the driving unit in which the rear wheels 3 are driven only by the motor 70.

The motor 70 provides the rear axles 79 with torque via the motor shaft 70a, fifth gear 71, sixth gear 72, countershaft 75, ninth gear 76, tenth gear 77, and differential gears 78, as shown by a circled arrow 3, thereby driving the rear wheels 3.

Since the engine 30 remains inactive in this state, the one-way clutch 67 is kept disconnected. The one-way clutch 67 is positioned just in front of the torque merging point of the engine 30 and the motor 70, so that neither the continuously variable transmission 65 nor the centrifugal clutch 61 is actuated when the rear wheels 3 are driven only by the motor 70. Therefore, it is possible to reduce consumption of the batteries 8, which is effective in driving the vehicle for a long period of time.

Figure 7:
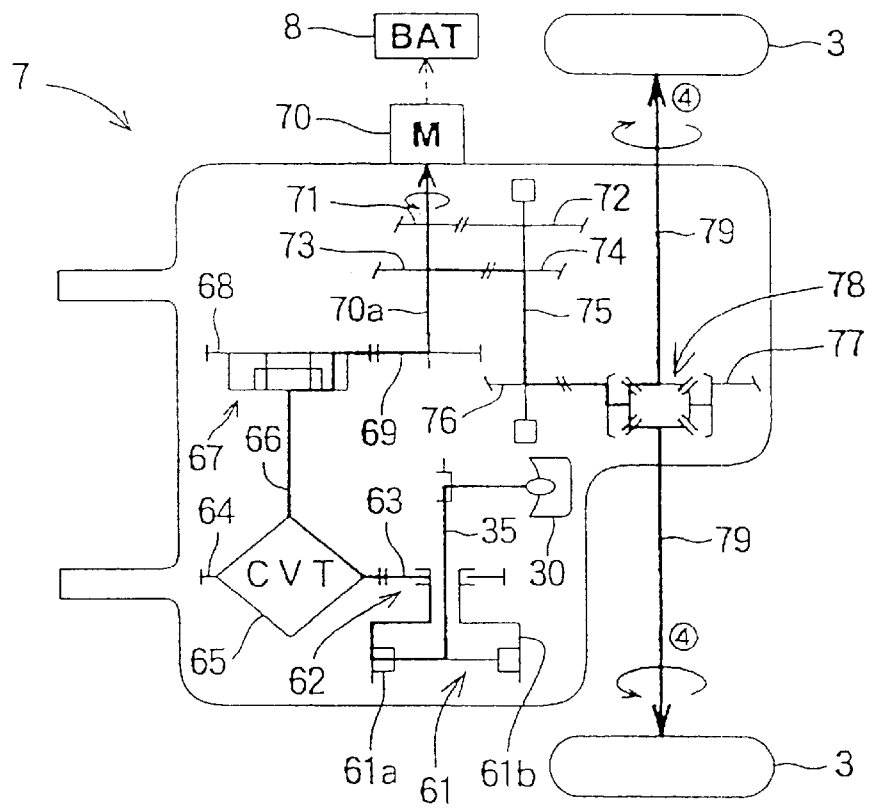
FIG. 7 shows the third operation of the drive unit.

FIG. 7 shows a third operation of the driving unit in which the rear wheels 3 are driven only by the engine 30.

The engine 30 provides torque to the motor shaft 70*a* via the crankshaft 35, centrifugal clutch 61, torque limiter 62, first gear 63, second gear 64, continuously variable transmission 65, link 66, one-way clutch 67, third gear 68, and fourth gear 69.

Therefore, the motor 70 functions as a generator for charging the batteries 8.

Further, the engine 30 provides torque to the right and rear axles 79 via the motor shaft 70*a*, seventh gear 73, eighth gear 74, countershaft 75, ninth gear 76, tenth gear 77, and differential gears 78 as shown by a circled arrow 4, so that the rear wheels 3 will be driven.

Figure 8:
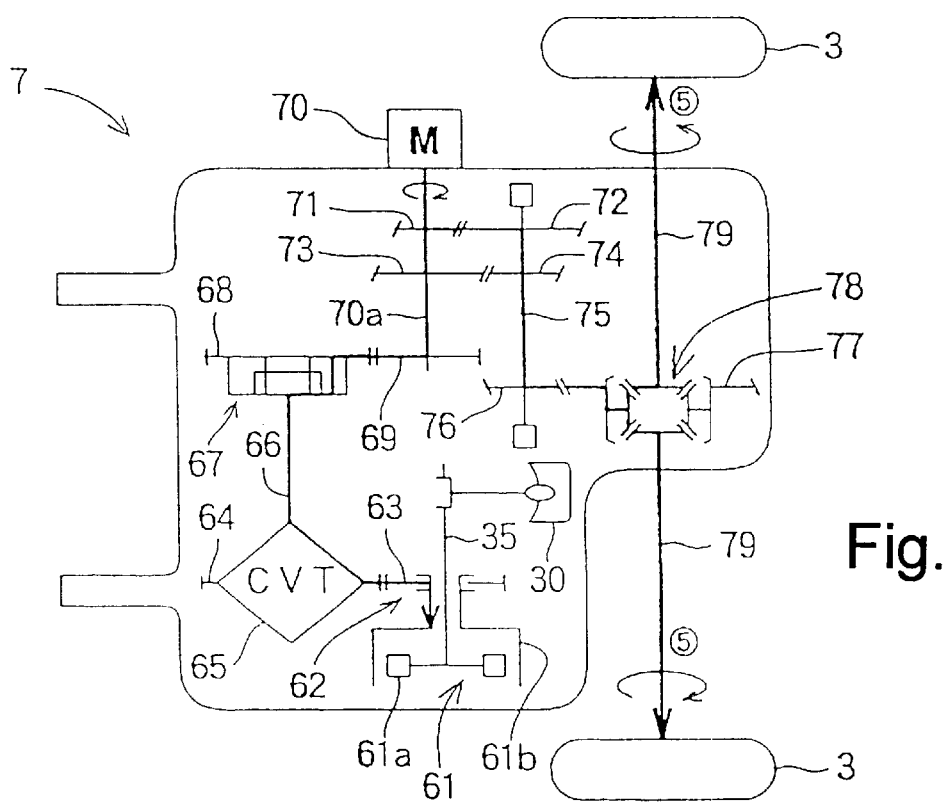
FIG. 8 shows the fourth operation of the drive unit.

FIG. 8 shows a fourth operation of the driving unit in which the hybrid vehicle is moved backwards using the motor 70.

The motor 70 rotates reversibly to supply reverse torque to the right and left rear axles 79 via the motor shaft 70*a*, fifth gear 71, sixth gear 72, countershaft 75, ninth gear 76, tenth gear 77, and differential gears 78 as shown by a circled arrow 5, so that the rear wheels 3 will be rotated in a reverse direction.

In this state, although the engine 30 remains inactive, the one-way clutch 67 remains connected due to the reverse rotation of the motor 70. The reverse torque from the motor shaft 70*a* is transmitted to the outer part 61*b* of the centrifugal clutch 61 via the fourth gear 69, third gear 68, one-way clutch 67, link 66, continuously variable transmission 65, second gear 64, first gear 63, and torque limiter 62. However, the engine 30 remains inactive because the outer and inner parts 61*b* and 61*a* are disconnected.

Figure 9:
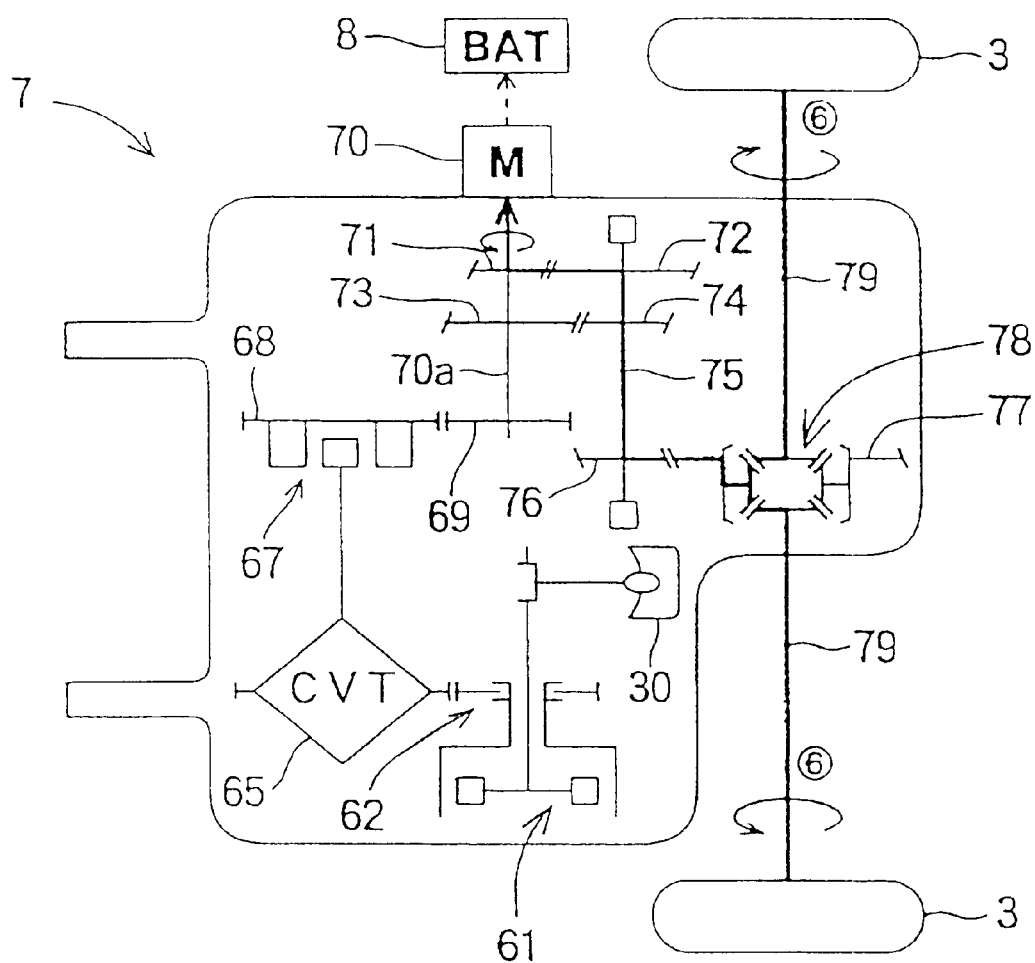
FIG. 9 shows the fifth operation of the drive unit.

FIG. 9 shows a fifth operation of the driving unit in which the hybrid vehicle is decelerated.

When the hybrid vehicle is decelerated, torque from the rear wheels 3 is transmitted to the motor shaft 70*a* via the rear axles 79, differential gears 78, tenth gear 77, ninth gear 76, countershaft 75, sixth gear 72, and fifth gear 71 as shown by a circled arrow 6. The motor 70 functions as a generator and charges the batteries 8. In the foregoing state, the one-way clutch 61 remains disconnected, so that torque is efficiently transmitted to the motor 70 when the hybrid vehicle is being decelerated. This promotes efficient charging of the battery 8.

The structure of the torque sensor 90 will be described in detail.

Figure 10:
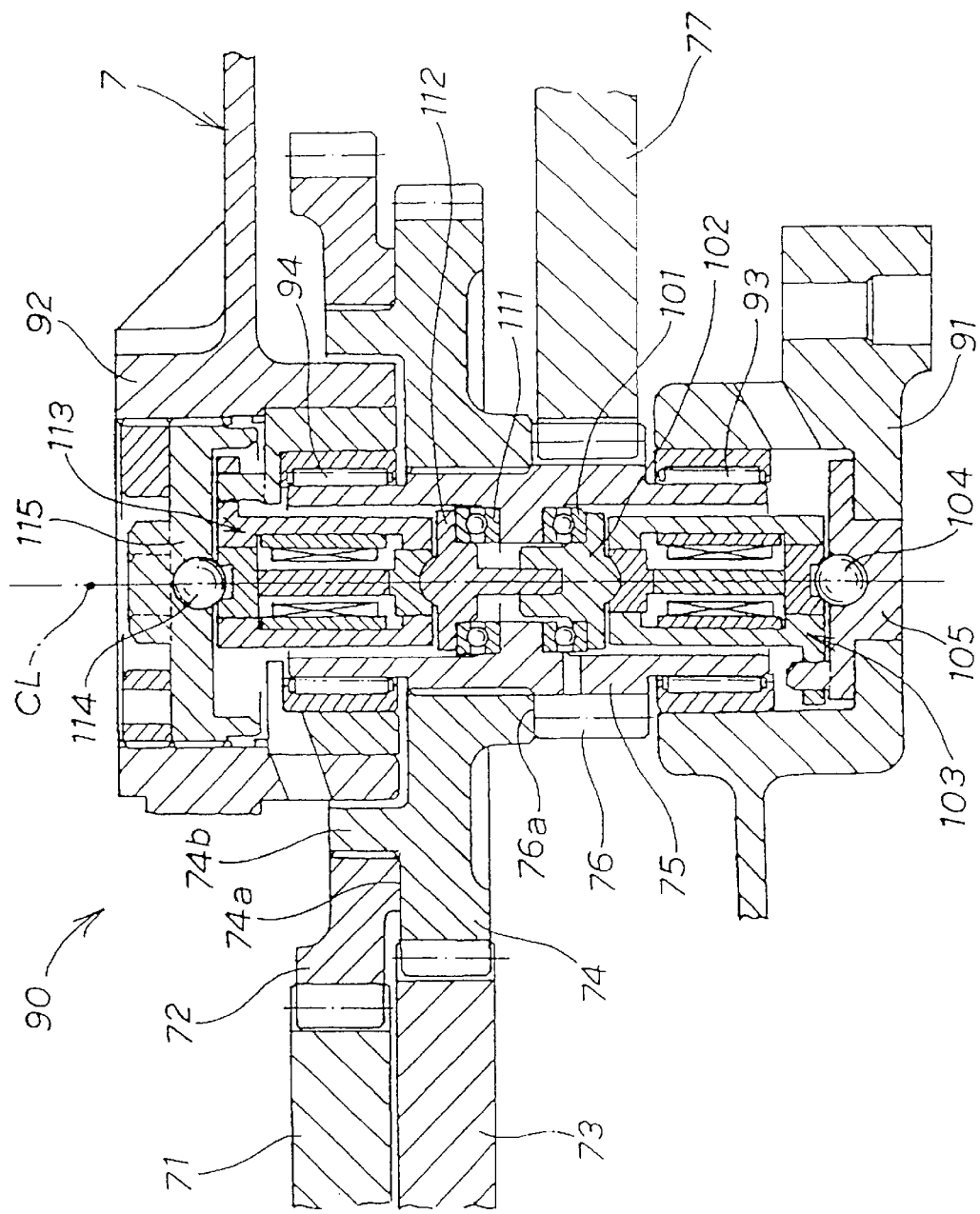
FIG. 10 is a sectional view of the torque sensor unit of the invention.

FIG. 10 is a sectional view of the torque sensor 90 according to the invention.

The torque sensor 90 mainly comprises: the countershaft 75 having opposite ends thereof rotatably coupled to first and second bearing units 91 and 92 via bearings 93 and 94; the three gears attached on the countershaft 75 (i.e. the sixth, eighth and ninth gears 72, 74 and 76); the first and second measuring instruments 103 and 113 attached along the center axis CL of the countershaft 75 in order to regulate the axial movement of the countershaft 75 and to measure axial load; a first thrust bearing 101 arranged between the countershaft 75 and the first axial load measuring instrument 103; and a second thrust bearing 111 arranged between the countershaft 75 and the second axial load measuring instrument 113.

To be more specific, the first bearing unit 91 has a receptacle 105 on its bottom, while the second bearing unit 92 is cylindrical and has an adjusting bolt 115 screwed into the center thereof. Both the first and second bearing units 91 and 92 are constituted by a part of the casing of the driving unit 7.

The ninth gear 76 is integral with the countershaft 75. The eighth gear 74 is placed on a side surface 76*a* of the ninth gear 76 and is serration-coupled to the countershaft 75. The sixth gear 72 is placed on a side surface 74*a* of the eighth gear 74 (opposite to the ninth gear 76) and is serration-coupled to an annular boss 74*b* on the side surface 74*a*. The sixth, eighth and ninth gears 72, 74 and 76 transmit torque to the countershaft 75.

Figure 11:
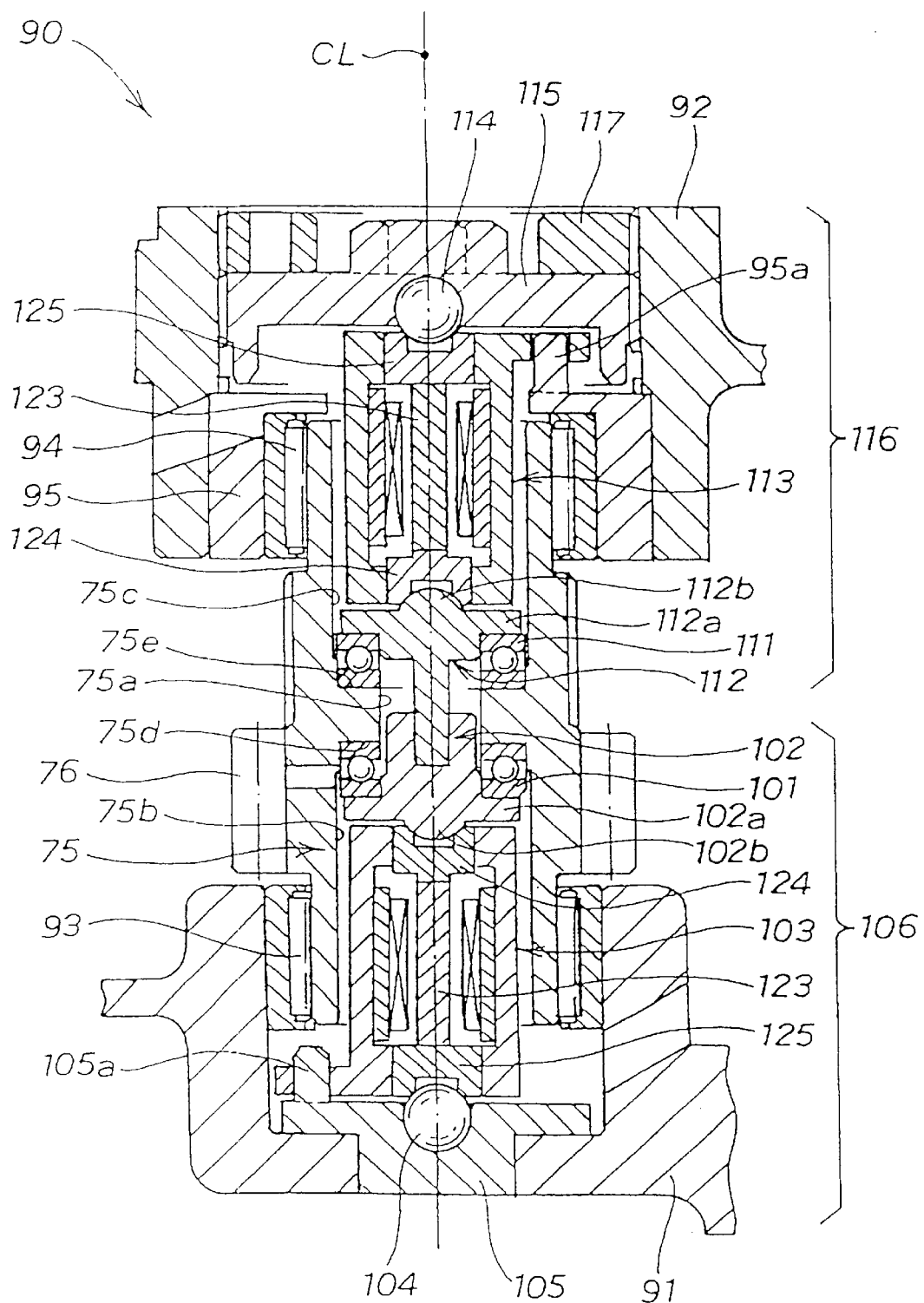
FIG. 11 is an enlarged sectional view of the essential part of the torque sensor unit.

FIG. 11 is an enlarged sectional view showing the essential parts of the torque sensor with the sixth and eighth gears 72 and 74 (shown in FIG. 10) removed.

The countershaft 75 is a hollow shaft, and has a small hole 75*a* at its longitudinal center, and first and second large holes 75*b* and 75*c* at its opposite ends. A first step 75*d* is present at a border of the small hole 75*a* and the first large hole 75*b*, and a second step 75*e* is present at a border of the small hole 75*a* and the second large hole 75*c*.

A feature of the invention is that the first thrust bearing 101, first thrust point 102, first axial load measuring instrument 103, first ball 104 and receptacle 105 are sequentially arranged on the first step 75*d* of the countershaft 75 via the first large hole 75*b*, thereby constituting an axial load receiving mechanism 106.

Further, the invention is characterized in that the second thrust bearing 111, second thrust point 112, second axial load measuring instrument 113, second ball 114 and adjusting bolt 115 are sequentially arranged on the second step 75*e* of the countershaft 75 via the second large hole 75*c*, thereby constituting a second axial load receiving mechanism 116.

These first and second axial load receiving mechanisms 106 and 116 can regulate the axial movement of the countershaft 75.

As described so far, the first thrust bearing 101 is disposed between the first step 75*d* and the first axial load measuring instrument 103. Further, the second thrust bearing 111 is disposed between the second step 75*e* and the second axial load measuring instrument 113. The frictional resistance in the rotating direction is very small between the countershaft 75 and the first and second axial load measuring instruments 103 and 113. As a result, there is no fear that the rotational moment caused in response to the rotation of the countershaft 75 acts on the first and second axial load measuring instruments 103 and 113. Only axial load is applied to the first and second measuring instruments 103 and 113, and noise components are reduced, which can improve measuring precision of the torque sensor 90.

The first thrust point 102 includes a flat plate 102*a* for receiving the axial load from the first thrust bearing 101, and a convex projection 102*b* for transmitting the axial load to the first measuring instrument 103. The second thrust point 112 includes a flat plate 112*a* for receiving the axial load from the second thrust bearing 111, and a convex projection 112*b* for transmitting the axial load to the second measuring instrument 113. Both the first and second thrust points 102 and 112 are aligned with each other on the center line CL.

A feature of the invention is that the first axial load measuring instrument 103 is axially supported along the center line CL by the convex projection 102*b* and the first ball 104 and the second axial load measuring instrument 113 are axially supported by the convex projection 112*b* and the second ball 114, and the first and second axial load receiving mechanisms 106 and 116 are arranged so as to face in opposite directions. Arrangement of the first and second measuring instruments 103 and 113 along the center line CL can make the torque sensor 90 compact.

Further, essential parts, i.e. most parts, of the first and second measuring instruments 103 and 113 are inserted into the first and second large holes 75b and 75c, so as to be housed in the countershaft 75. This is effective in making the torque sensor 90 even more compact.

When the second ball 114 is axially pushed by applying an appropriate pressure after adjusting the adjusting bolt 115, this pressure acts in a route via the second ball 114, second measuring instrument 113, second thrust point 112, second thrust bearing 111, second step 75e, countershaft 75, first step 75d, first thrust bearing 101, first thrust point 102, first measuring instrumnent 103, first ball 104, receptacle 105, and first bearing 91. As a result, it is possible to eliminate extra axial gaps between components. Adjustment of the single adjusting bolt 115 can easily maintain the foregoing components in a reliable state.

The receptacle 105 has a check pin 105a for preventing the rotation of the first measuring instrument 103. The second bearing unit 92 has the bearing 94 attached via a bush 9S, which has a check pin 95a for preventing the rotation of the second measuring instrument 113.

The bearings 93 and 94 are needle bearings. The first and second balls 104 and 114 are steel balls. A lock nut 117 is provided.

Figure 12:
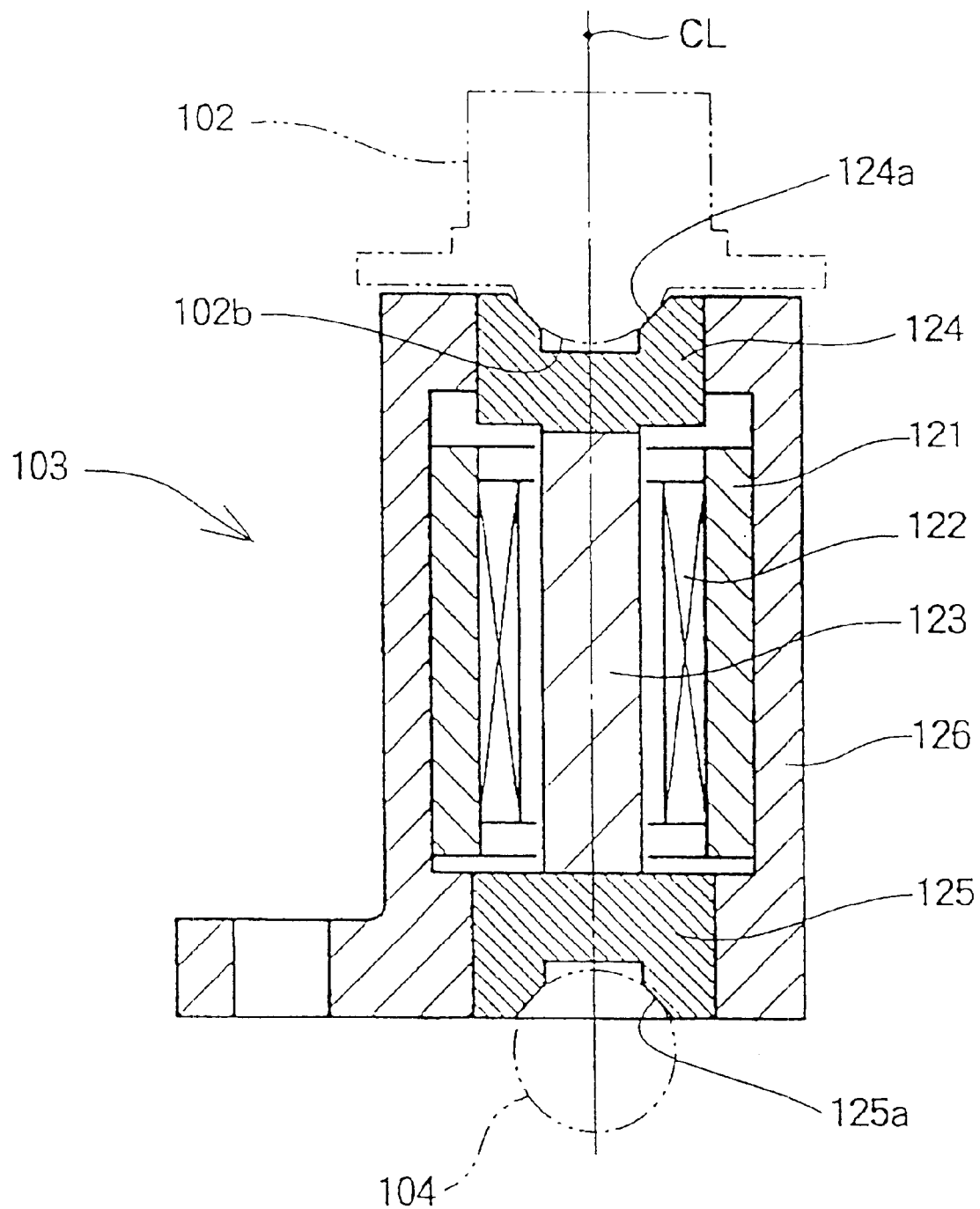
FIG. 12 is a sectional view of the first axial load measuring instrument of the invention.

FIG. 12 is a sectional view of the first axial load measuring instrument 103 according to the invention.

The first measuring instrument 103 is a magnetic strain sensor including a coil 122 wound on an inner surface of a cylindrical coil bobbin 121, a magnetostrictive element 123, a pair of element holders 124 and 125 provided at opposite ends of the magnetostrictive element 123, and a casing 126 housing the foregoing components. Generally speaking, when mechanically strained by force, ferromagnetic material varies its magnetizing characteristics. The magnetic strain sensor utilizes such magnetostrictive effect. The center of the coil 122 agrees with the center line CL of the countershaft 75. Specifically, the magnetostrictive element 123 is a ferromagnetic member extending on the center line CL.

The element holder 124 has a concave recess 124a with which the projection 102b of the first thrust point 102 comes into contact, while the element holder 125 has a concave recess 125a with which the first ball 104 comes into contact. These concave recesses 124a and 125a are on the center line CL.

When compressive load, i.e. axial load, is generated between the projection 102b and first ball 104 on the center line CL, the magnetostrictive element 123 is compressed via the element holders 124 and 125, so as to be subjected to strain. As a result, the magnetostrictive element 123 is subjected to strain in accordance with the compressed load generated between the projection 102b and the first ball 104. Therefore, the magnetostrictive element 123 is subjected to strain and produces an electric measurement signal via the coil 122 in accordance with the strain.

The first measuring instrument 103 has its opposite ends supported by spherical members, so that the center thereof can be reliably aligned with the center line CL. Therefore, the axial load acting on the countershaft 75 is reliably transmitted to the magnetostrictive element 123 on the center line CL, and can be precisely measured.

The second measuring instrument 113 shown in FIG. 11 is configured and operates similarly to the first measuring instrument 103, and is positioned opposite the first measuring instrument 103, and is not described here.

Figure 13:
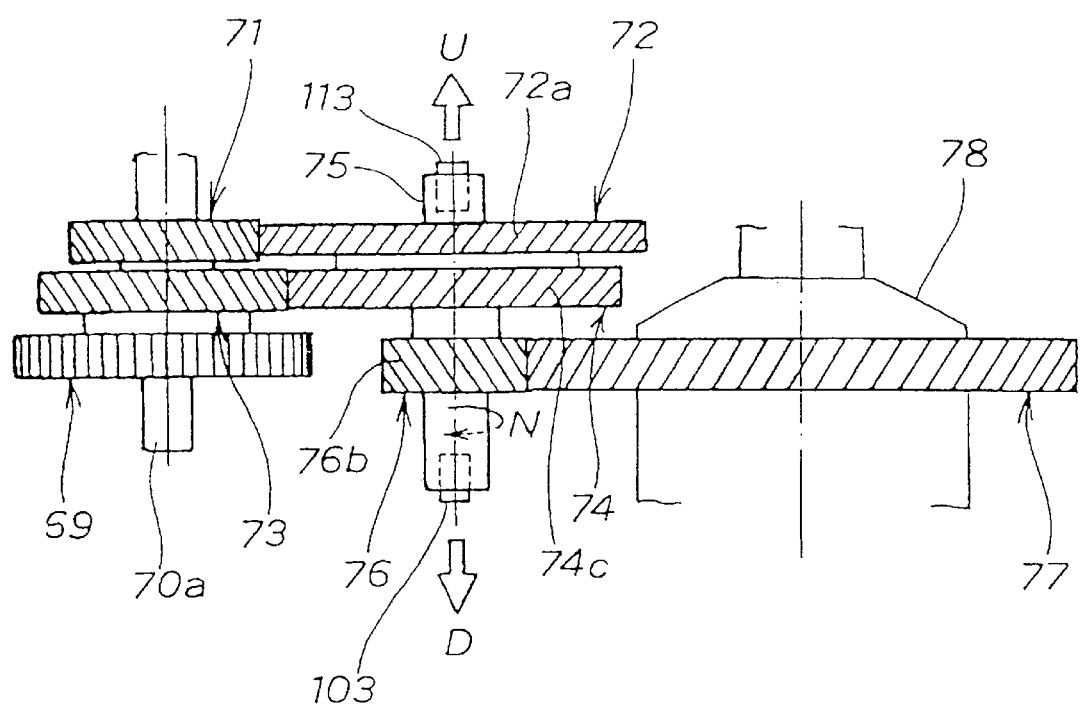
FIG. 13 shows the arrangement of the gears around the torque sensor unit of the invention.

FIG. 13 is a schematic drawing showing the arrangement of the helical gears 71, 72, 73, 74, 76 and 77 (shown in FIGS. 5 to 10) used in the torque sensor of the invention.

The teeth 72a of the sixth gear 72 and teeth 74a of the eighth gear 74 are twisted oblique in the same direction. On the other hand, the teeth 76b of the ninth gear 76 are twisted oblique in a direction reverse to that of the foregoing teeth 72a and 74a.

For instance, it is assumed here that the countershaft 75 is rotated in the direction shown by an arrow N. Specifically, the gears 71, 72, 73, 74, 76 and 77 are twisted obliquely in such a manner that axial load in the direction shown by an arrow D (directed toward the first measuring instrument 103) acts on the countershaft 75 in order to transmit torque from the fifth gear 71 to the sixth gear 72, or from the seventh gear 73 to the eighth gear 74, and such that axial load in the direction shown by an arrow U (toward the second measuring instrument 113) acts on the countershaft 75.

Figure 14A:
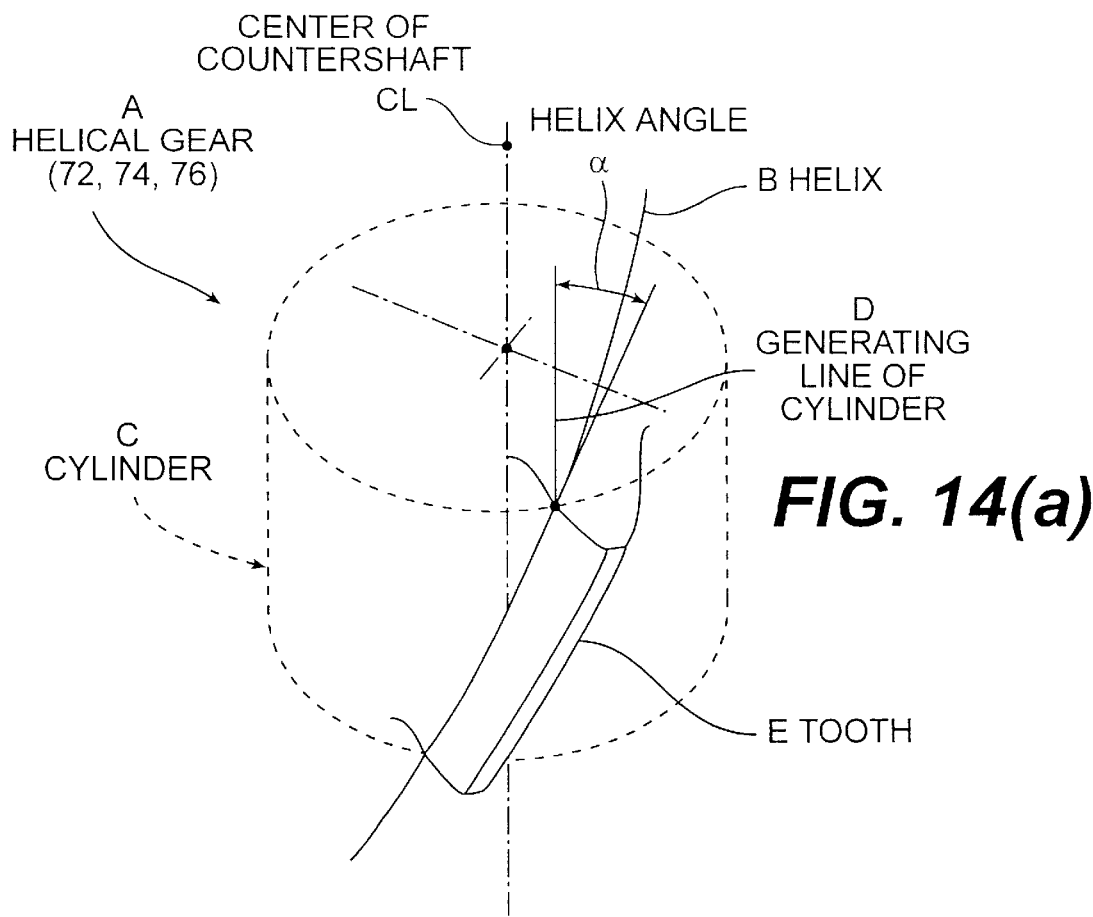
FIGS. 14(a) and 14(b) show the concept of the helical gear.
Figure 14B:
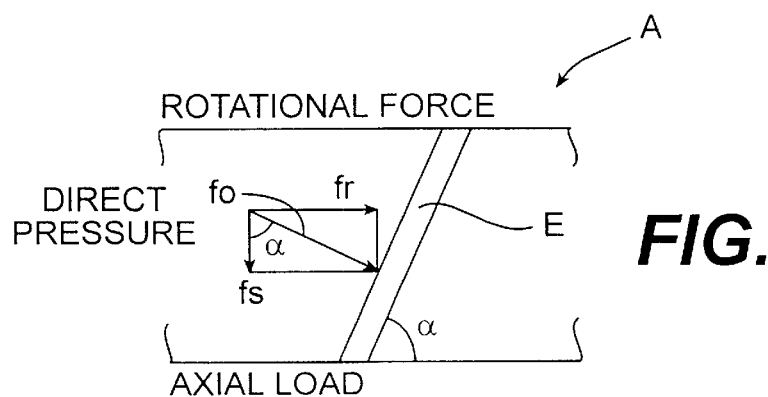

FIGS. 14(a) and 14(b) show the concept of the helical gear such as the sixth, eighth or ninth gear 72, 74 or 76, which is depicted as a conceptional helical gear A.

Referring to FIG. 14(a), the helical gear A is a so-called cylindrical gear. In the helical gear A, each tooth trace, i.e. an intersection of a tooth flank and a reference pitch surface, is a helix B having a predetermined helix angle $\alpha$. Here, the term "helix angle $\alpha$" denotes the angle $\alpha$ formed by the helix B and a generating line D of a cylinder C on which the helix B is assumed to be present. For instance, if the cylinder C is a reference pitch cylinder, the angle $\alpha$ is a helix angle of the reference pitch cylinder.

FIG. 14(b) shows the relationship between direct pressure fo and rotational force fr acting on a tooth E of the helical gear A, and axial load fs.

In the helical gear A, torque and direct pressure fo are correlative. Further, direct pressure fo, rotational force fr and axial load fs (i.e. thrust) are correlative in accordance with the helix angle $\alpha$. In other words, when torque acts on the helical gear A, axial load fs is generated depending upon the helix angle $\alpha$. Therefore, torque can be known by measuring the axial load fs. In the present invention, the axial load fs generated at the helical gear A is actively measured in order to detect torque.

Figure 15:
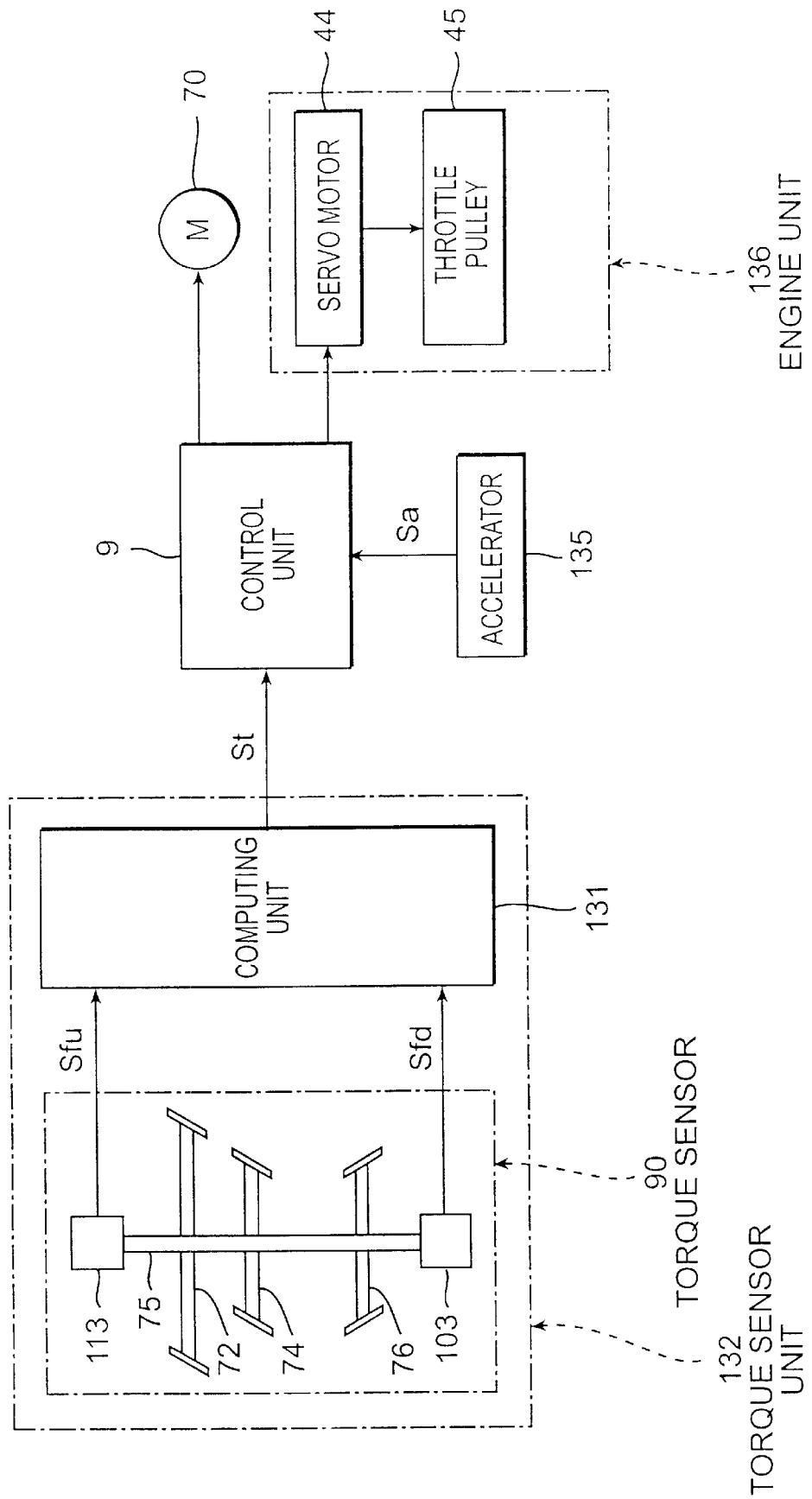
FIG. 15 is a circuit diagram of components around the torque sensor.

FIG. 15 is a diagram showing a circuit related to the torque sensor 90.

In the torque sensor 90, the first measuring instrument 103 produces a measuring signal Sfd on the basis of measured axial load while the second measuring instrument 113 produces a measuring signal Sfu on the basis of the measured axial load. These signals Sfd and Sfu are received by a computing unit 131. The computing unit 131 converts the axial load obtained as the signals Sfd and Sfu into torque based on the helix angles of the helical gears (sixth, eighth and ninth gears 72, 74 and 76), and outputs it as a torque signal St in accordance with the torque. The torque sensor 90 and computing unit 131 in combination constitute a torque sensor unit 132.

The control unit 9 controls an engine unit 136 and motor 70 on the basis of the torque signal St from the computing unit 131 and a signal Sa from an accelerator 135. The engine unit 136 includes the engine 30 (see FIG. 3) and an engine controlling member which includes a servo motor 44, throttle pulley 45, and a spark plug (not shown).

Figure 16A:
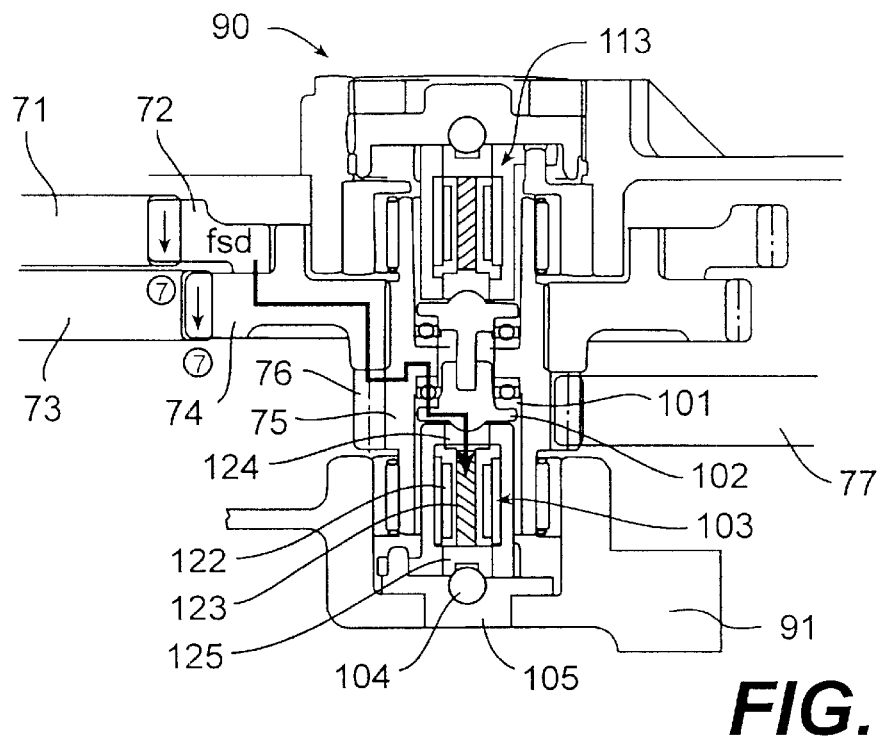
FIGS. 16(a) and 16(b) show the first operation of the torque sensor unit.
Figure 16B:
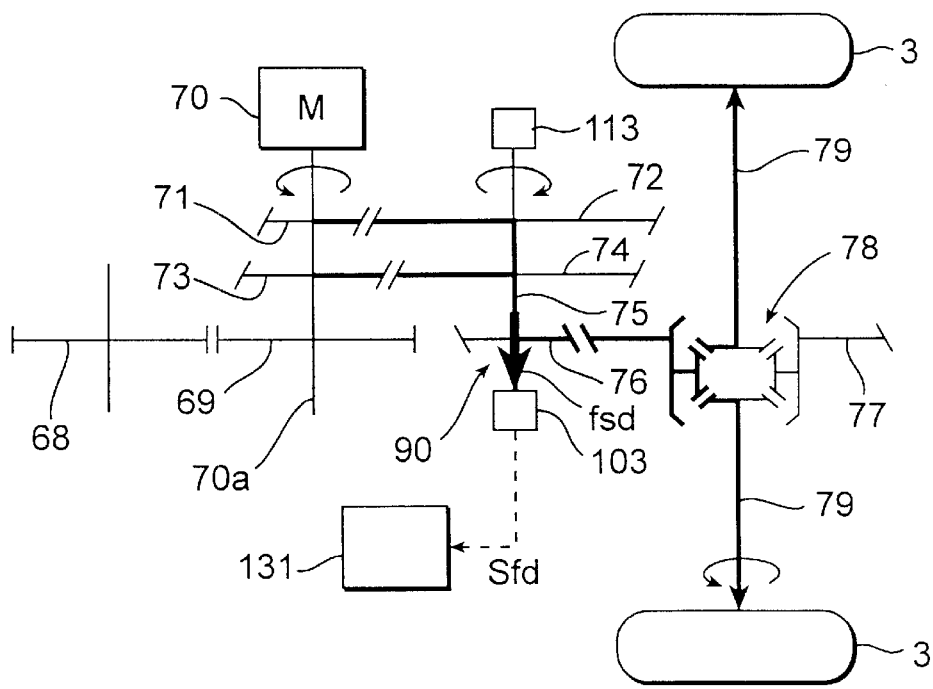

FIGS. 16(a) and 16(b) show a first operation of the torque sensor unit 132 of the invention.

Specifically, FIG. 16(a) shows a route through which axial load is transmitted to the first measuring instrument 103 from the sixth and eighth gears 72 and 74. When torque is transmitted from the fifth helical gear 71 to the sixth helical gear 72 or from the seventh helical gear 73 to the eighth helical gear 74, axial load fed is generated in the sixth and eighth gears 72 and 74 in the direction shown by a circled arrow 7. This axial load fsd is transmitted to the first bearing unit 91 via the sixth gear 72, eighth gear 74, ninth gear 76, countershaft 75, first thrust bearing 101, first thrust point 102, first measuring instrument 103 (i.e. the element holder 124, magnetostrictive element 123 and element holder 125), first ball 104, and receptacle 105.

Therefore, the magnetostrictive element 123 is compressed and twisted in accordance with the axial load, so that the first measuring instrument 103 outputs an electric signal indicating the measured axial load, from the coil 122. In other words, the first measuring instrument 103 outputs the measurement signal in accordance with the torque transmitted to the sixth and eighth gears 72 and 74.

FIG. 16(b) shows how torque is transmitted when the rear wheels 3 are accelerated using the engine 30 (see FIG. 3) and/or the motor 70. Specifically, when the hybrid vehicle is moved forward at an accelerated speed, torque is transmitted to the countershaft 75 via the route shown in FIG. 16(a), and further to the rear wheels 3 via the countershaft 75, ninth gear 76, tenth gear 77, differential gears 78, and right and left rear axles 79. In this state, the first measuring instrument 103 generates the measuring signal Slid in accordance with the measured axial load fed. The computing unit 131 converts the axial load obtained as the signal Sfd into torque on the basis of the helix angles of the helical gears, and outputs a torque signal in accordance with the torque.

Figure 17A:
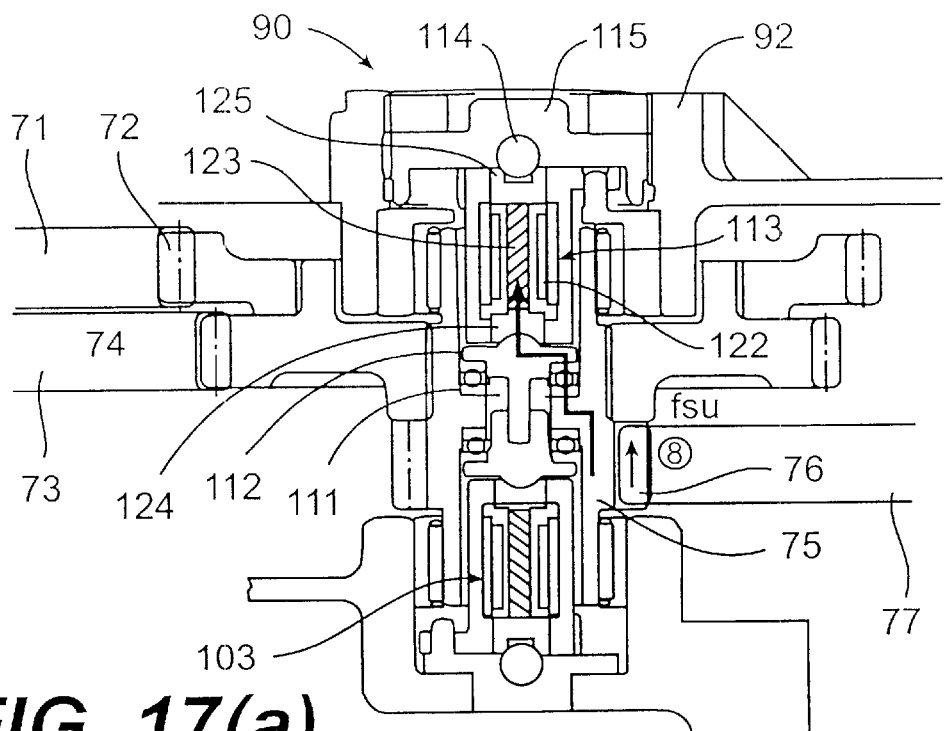
FIGS. 17(a) and 17(b) show the second operation of the torque sensor unit.
Figure 17B:
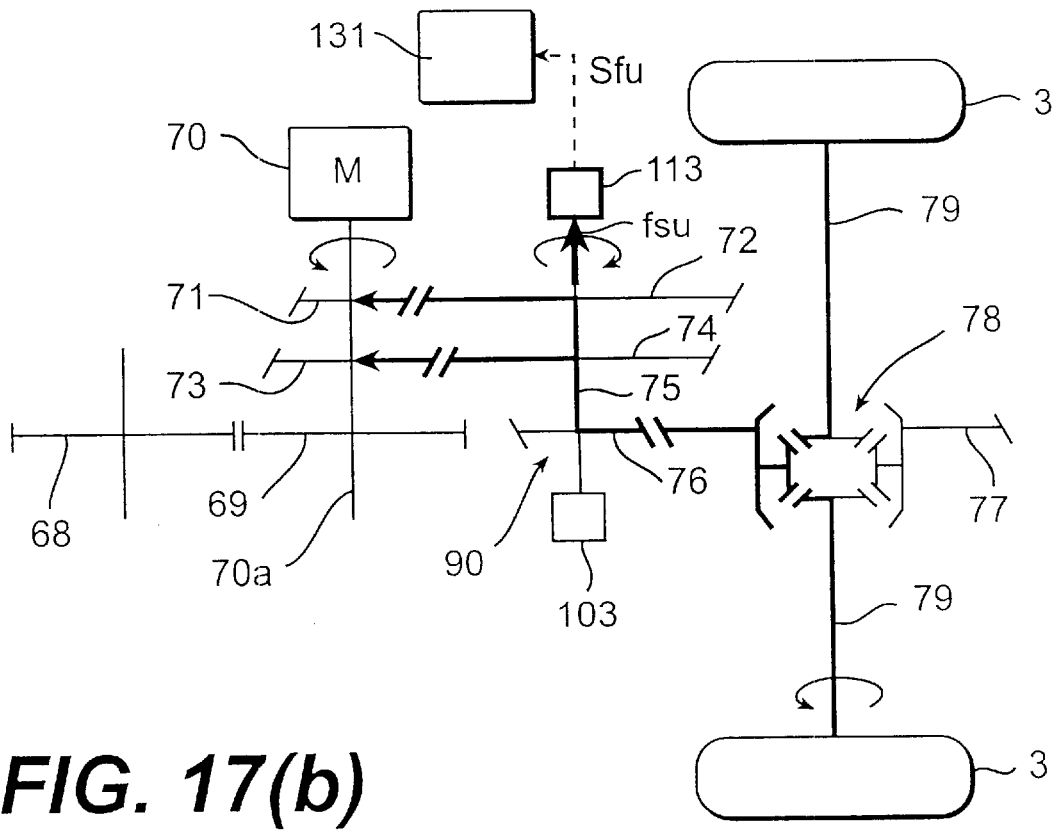

FIGS. 17(a) and 17(b) show a second operation of the torque sensor unit 132 of the invention.

Referring to FIG. 17(a), axial load is applied to the second measuring instrument 113 from the second gear 76. When torque is transmitted from the tenth helical gear 77 to the ninth helical gear 76, axial load fsu is generated at the ninth gear 76 in the direction shown by a circled arrow 8. This axial load fsu is transmitted to the second bearing unit 92 via the ninth gear 76, countershaft 75, second thrust bearing 111, second thrust point 112, second measuring instrument 113 (i.e. the element holder 124, magnetostrictive element 123 and element holder 125), second ball 114 and adjusting bolt 115.

When the magnetostrictive element 123 is compressed and is strained in accordance with the axial load, the second measuring instrument 113 outputs an electric axial load signal in accordance with the strain. In other words, the second measuring instrument 113 outputs the signal indicative of the measured axial load on the basis of torque transmitted to the ninth gear 76.

When the hybrid vehicle is moved backward at a reduced speed, torque from the rear wheels 3, 3 is transmitted, as shown in FIG. 17(b), to the countershaft 75 via the route (shown in FIG. 17(a)), and is further transmitted to the motor shaft 70a via the countershaft 75, sixth gear 72, and fifth gear 71. In this state, the second measuring instrument 113 produces a signal Sfu indicative of the measured axial load fsu. The computing unit 131 converts the axial load obtained as the signal Sfu into torque on the basis of the helix angle of the helical gears, and produces a torque signal indicative of the torque.

The computing unit 131 shown in FIG. 15 detects a magnitude and transmitting direction of torque on the basis of either the signal Sfd or Sfu from the first measuring instrument 103 or the second measuring instrument 113, and outputs a detection signal (i.e. torque signal) to the control unit 9 as a feed-back signal, thereby controlling the engine 30 (shown in FIG. 3) and/or the motor 70, thereby enabling the hybrid vehicle to be efficiently driven.

As described so far, only one torque sensor unit 132 constituted by the first and second measuring instruments 103 and 113 housed in the countershaft 75 can easily detect both (1) torque for moving the hybrid vehicle at an increased speed using the engine 30 and the motor 70, and (2) reverse torque for moving the hybrid vehicle forward at a reduced speed. Therefore, the torque sensor unit 132 of the invention is most suitable to installation in the hybrid vehicle.

Figure 18:
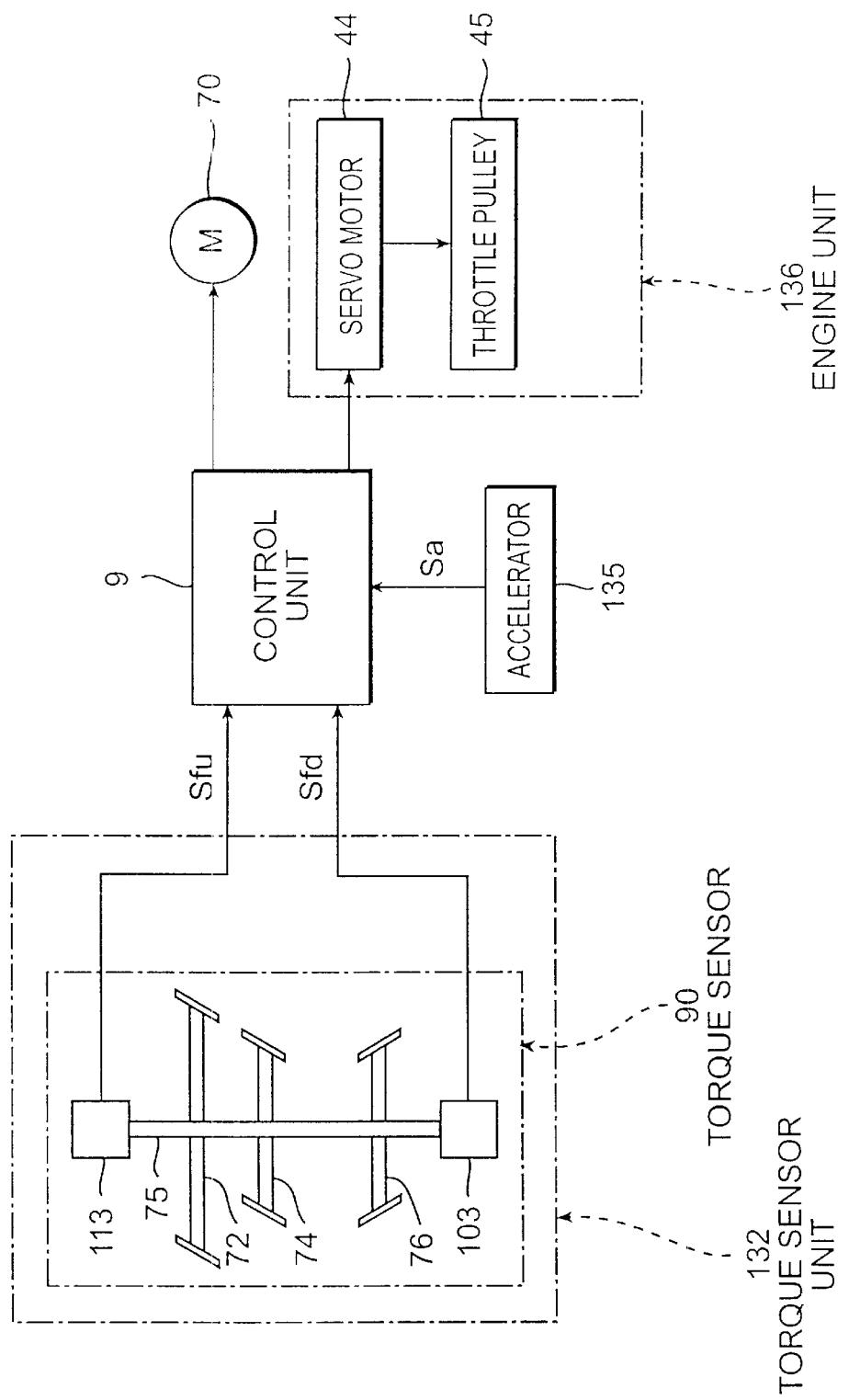
FIG. 18 shows a circuit of the modified torque sensor unit.

In the foregoing embodiment, (1) the torque sensor unit 132 is applicable not only to the configuration for the computing unit 131 to convert the axial load, measured by the first and second measuring instruments 103 and 113, into torque but also to a modified configuration shown in FIG. 18, for example. In other words, the computing unit 131 is not always necessary.

FIG. 18 is a circuit diagram of a modified torque sensor unit 132 of the invention, in which both the first and second measuring instruments 103 and 113 generate signals Sfd and Sfu indicative of measured axial loads and directly send them to the control unit 9.

The measuring signals Sfd and Sfu are generated by the torque sensor unit 132 on the basis of the measured axial loads and torque. Therefore, these signals are usable as the "axial loads" signal and "torque" signal even if they are not converted by the computing unit 131 (shown in FIG. 15).

(2) Each of the sixth, eighth and ninth gears 72, 74 and 76 may be integral with or fixed to the countershaft 75 so long as they can provide the countershaft 75 with not only torque but also the axial load generated when they are engaged with one another.

(3) The first and second measuring instruments 103 and 113 may be magnetic strain sensors, strain gauges or piezo type sensors so long as they can measure the axial loads applied to the countershaft 75.

(4) The computing unit 131 may be provided either in the control unit 9 or in the torque sensor 90.

(5) The torque sensor unit 132 is applicable to not only detection of torque in a power transmission system of the hybrid vehicle 1 but also detection of torque in various other devices.

(6) The torque sensor unit 132 may include either the first measuring instrument 103 or the second measuring instrument 113.

The torque sensor unit of the invention is effective in the following respects.

According to the present invention, the torque sensor unit comprises a countershaft, helical gears for providing the countershaft with not only torque but also axial load generated by their mutual engagement, and axial load measuring instruments disposed coaxially with the countershaft for the purpose of regulating axial movement of the countershaft and measuring the axial load. The gears for transmitting torque to the countershaft are also used in order to generate axial load in accordance with the torque, and the axial load measuring instruments are disposed coaxially with the countershaft. Therefore, the measuring instruments do not radially project from the countershaft, which is effective in making the torque sensor unit compact.

According to the present invention, the torque sensor unit has thrust bearings interposed between the countershaft and the axial load measuring instruments. Frictional resistance in the rotating direction can be reduced between the countershaft and the axial torque measuring instruments. Therefore, the axial load measuring instruments receive only the axial load, which is effective in reducing noise components and improving detecting precision of the torque sensor unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque sensor unit comprising:

a countershaft;

helical gears for providing said countershaft with not only torque but also axial load generated by mutual engagement; and axial load measuring means disposed coaxially and overlapped with said countershaft for regulating axial movement of said countershaft and measuring the axial load.

2. The torque sensor unit of claim 1, wherein thrust bearings are interposed between said countershaft and said axial load measuring means.

3. A torque sensor unit for detecting torque comprising:

a first power supply;

a second power supply;

said first and second power supplies being selectively, operatively connected to a countershaft for transmitting torque for propelling a vehicle; and axial load measuring means for regulating axial movement of said countershaft and measuring the axial load.

4. The torque sensor unit according to claim 3, wherein thrust bearings are interposed between said countershaft and said axial load measuring means.

5. The torque sensor unit according to claim 3, wherein said torque sensor unit includes a first and second measuring instrument for measuring axial load.

6. The torque sensor unit according to claim 5, and further including a computing unit for receiving an input from said first and second measuring instruments and providing an output therefrom.

7. The torque sensor unit according to claim 5, wherein the first and second measuring instruments are magnetic strain sensors.

8. The torque sensor unit according to claim 5, wherein the first and second measuring instruments are strain gauges.

9. The torque sensor unit according to claim 5, wherein the first and second measuring instruments are piezo type sensors.

* * * * *